2,992,893
PROCESS FOR TREATING ALUMINUM ORES

Paul Soudan and Jean O. Breton, Aix-en-Provence, France, assignors to Pechiney Compagnie de Produits Chimiques et Electrometallurgiques, Paris, France
Filed Jan. 15, 1958, Ser. No. 709,134
Claims priority, application France Jan. 15, 1957
8 Claims. (Cl. 23—143)

This invention relates to a new process for treating bauxites and other alumina- and silica-containing minerals, and more particularly bauxite rich in silica, with the view of recovering alumina.

It is known that when bauxite is digested with alkaline brines, particularly according to the Bayer process, in order to extract alumina, the presence of silica in the bauxite causes a considerable loss of alkali; this loss is due to the formation of an insoluble compound constituted by a double aluminum and sodium silicate having approximately a composition of $$5SiO_2 \cdot 3Al_2O_3 \cdot 3Na_2O \cdot 5H_2O$$

Consequently, the yield of extraction of alumina decreases as the content in silica of the treated bauxite rises, while the consumption of sodium hydroxide increases.

Several processes are known in the art which relate to the recovery of the caustic values such as sodium hydroxide in the course of the treatment of bauxite; these known processes are based on firing the residues of the alkaline digestion, in the presence of alkaline-earths, compounds such as chalk or calcium carbonate, or propose to add lime to the digesting brines. However, the former processes are expensive, and complicate the plant by the requirement of calcination apparatus, while the latter suffer from the drawback of a diminished yield of alumina recovery because of the formation of calcium aluminate.

It is, therefore, an object of our invention to provide a new process for the treatment of bauxites and in particular bauxites rich in silica, which can be carried out with the apparatus available in the Bayer process per se, and without any calcination step.

It is more particularly an object of our invention to provide a new process for the treatment of bauxites, and in particular bauxites rich in silica which reduces losses of caustic values, and in particular of $Na_2O$, to a minimum.

The aforesaid objects are attained and the above-mentioned drawbacks of the known processes avoided by the new process for treating bauxite and other alumina- and silica-containing minerals which comprises, in combination, the steps of (a) solubilizing the alumina-containing mineral by a digestion in an alkaline medium, and (b) subsequently treating the residues from the digestion step, in particular the red mud, with an alkaline earth metal base in aqueous medium in order to solubilize the caustic values (expressed in alkali metal oxides and particularly as $Na_2O$) retained in the residues, for instance, in insoluble compounds such as $5SiO_2 \cdot 3Al_2O_3 \cdot 3Na_2O \cdot 5H_2O$.

Figure 1:
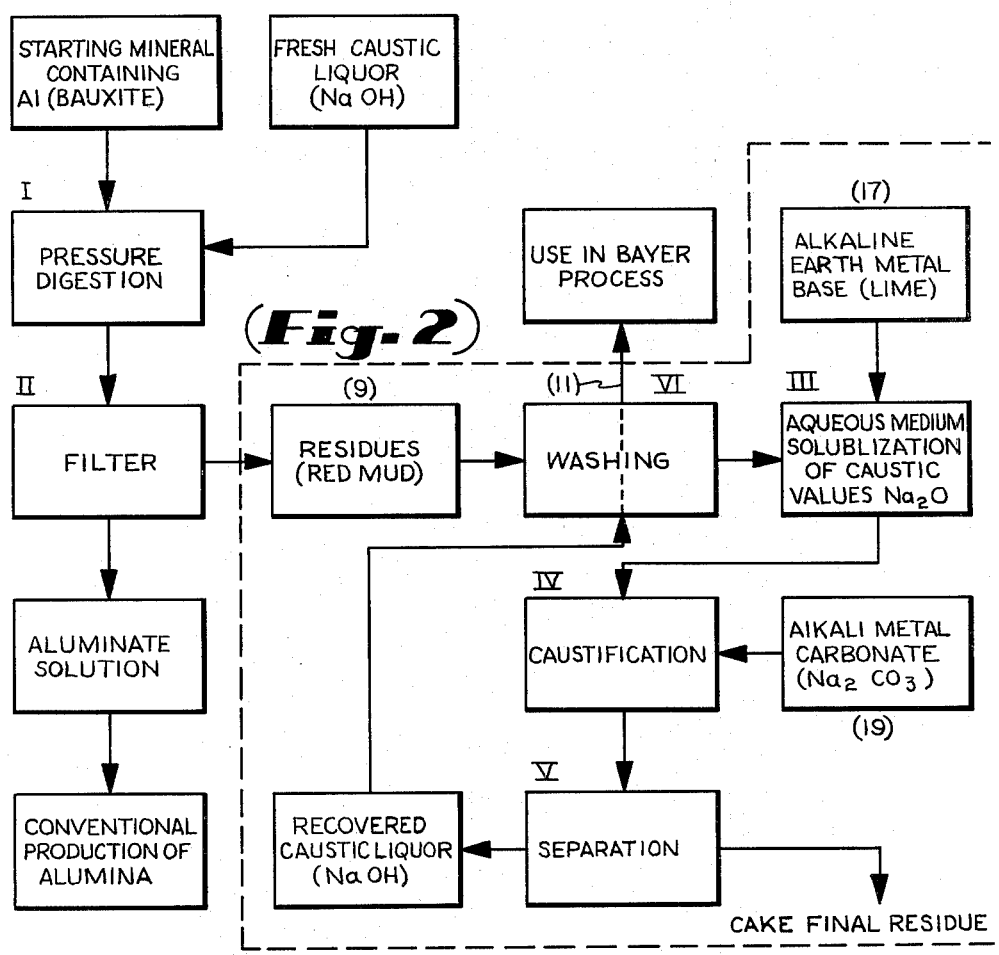
Figure 2:
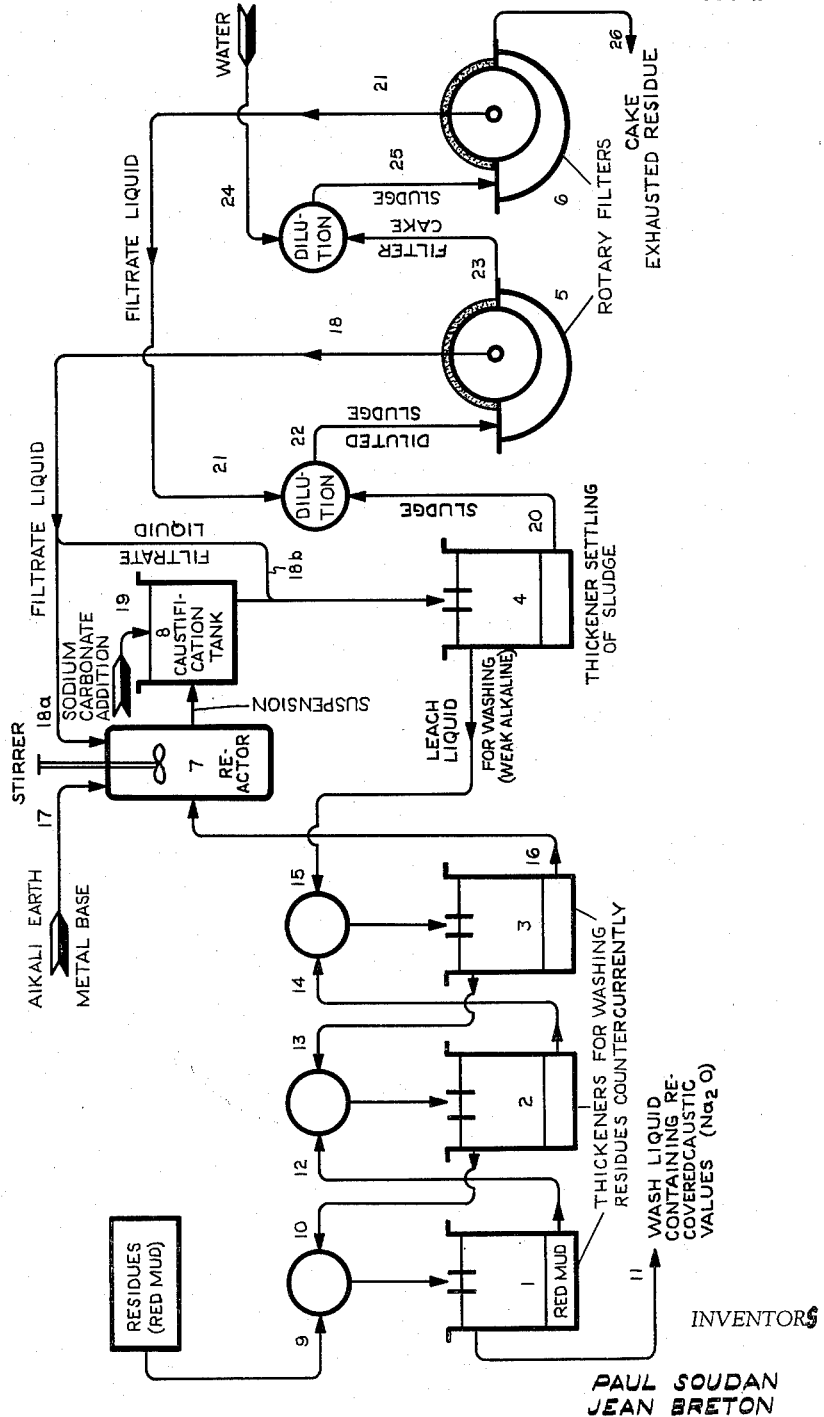

The invention will be described in greater detail hereinafter in connection with the accompanying drawings in which FIGURE 1 is a flow sheet of the process according to our invention;

FIGURE 2 shows the steps of the process illustrated in FIGURE 1, which are enclosed in a box of dashed lines, in a schematic representation of an apparatus system, this being one example only of carrying out the invention.

Referring now to the drawings, and in accordance with a first feature of the invention, a suitable starting material such as bauxite is first digested (I) in an alkaline medium in a conventional manner, in order to dissolve the alumina contained in the material, in the form of an alkali metal aluminate; the aluminate solution is separated from suspended undissolved matter by filtration or similar known separating methods (II), and residues are obtained which shall be referred to hereinafter for the sake of brevity as "red mud" which is the residue obtained when the starting material is bauxite; the residues of this filtration are now treated (III) in an aqueous medium by adding to the same, an amount of alkaline earth metal base, such as lime, the amount of which is proportioned to their content in silica.

According to another feature of the invention, illustrated in detail in FIGURE 2, the residues are washed— before the treatment with the alkaline earth metal base in aqueous solution—so that they contain as little as possible of alkali metal aluminate; in this way, losses of alumina, which would result due to the precipitation of $Al_2O_3$ as alkaline earth metal aluminate formed from the alkali metal aluminate and the added lime, are avoided. The aqueous medium should, therefore, contain less than 30 grams of dissolved $Al_2O_3$ per liter, and preferably less than 20 grams/liter when introduced to step III; it is particularly desirable that the amount of $Al_2O_3$ in solution be less than 5 grams/liter.

Another important feature of the present invention resides in the addition of such amounts of alkaline earth metal bases to the residue in aqueous medium that there should be 2.5 to 5 moles of alkaline earth metal base per every mole of alkali metal oxide combined in the form of insoluble silicate in the treated residues. Preferably this ratio is comprised between 3.4 and 4.0. Since, usually, the alkaline earth metal base is lime, and the alkali metal oxide $Na_2O$, the best proportions, for carrying out the invention, are 3.4 to 4 moles of CaO for every mole of $Na_2O$ combined in the insoluble silicate.

Hereinafter, the terms of "lime" and "sodium oxide" will often be used for sake of brevity, but it is to be understood that these are equally representative of other alkali metal oxides and alkaline earth metal bases eventually involved.

The treatment of the residues with lime in aqueous medium (III) is preferably carried out at temperatures above 50° C. It may take place at atmospheric or higher pressure. Thus, in the practice, the operation may be effected between 50° and 100° C. at atmospheric pressure, or between 100° and 240° C. in autoclaves under pressure. For example, the operation may be carried out on an industrial scale in an autoclave at 180° to 240° C.

As a very important feature of our invention, the lime to be added should be as finely divided as possible. In fact, we have found that the fineness of the alkaline earth metal base has a strong influence on the velocity of the reaction: the latter is the more rapid, the finer the particles of the lime used. In conformity with a preferred feature of the invention, the alkaline earth metal base is used in the form of its hydrate, and as a suspension in which at least 60% of the particles have a grain size below 65 microns. Preferably all the particles are of less than 65 microns in diameter, while about 40% of them have diameters comprised between 25 and 65 microns. Particularly advantageous results are obtained when the "average grain diameter" of the suspension falls between about 5 and 10 microns.

In order to ensure a good contact between the reacting substances and bring the reaction to an end more speedily, the process of the invention is performed with vigorous stirring. It is particularly advisable to use a stirrer whose velocity is preferably of 2 to 3 meters per second.

Another feature of the invention resides in carrying out the treatment of the residues according to step (III) in an aqueous medium which is poor in alkali metal ions. In fact, the reaction whereby $Na_2O$ bound in an insoluble silicate becomes solubilized, is limited by the concentration of sodium hydroxide present in the aqueous reacting medium; as the reaction equilibrium is dependent upon the prevailing temperature, the permissible concentrations of NaOH vary as a function of temperature. Generally speaking, dependent on the different temperatures which can be practically applied in the process of the invention, the best results are obtained when the aqueous medium in which the residues are suspended, does not contain more than 50 grams $Na_2O$ per liter; preferably it contains 5 to 20 grams $Na_2O$ per liter. According to a particularly advantageous mode of carrying out the process of the invention, the suspension resulting from the action of lime on the residues, as set forth above, is subjected to a caustification step (IV) with an alkali metal carbonate, preferably sodium carbonate. The compounds of calcium, such as silico-aluminates, silicates and aluminates, resulting from the action of lime on sodium silico-aluminate, thereby caustify the sodium carbonate. The caustified soda solution can then be used to provide a part of the total $Na_2O$ required in the process so that part of the expensive caustic soda can be replaced by the less expensive sodium carbonate.

A very economical application of the process according to the invention comprises the step of using the alkaline solutions resulting from this caustification step (IV) and separated by, for instance, a further filtration step (V) for washing (VI) the residues (red mud) which result from the alkaline digestion of bauxites prior to their treatment according to step III. In fact, the concentration of alkali in these solutions makes them suitable for said washing, while, it would not be sufficient for direct use in the digestion of the bauxite. After their caustic value has been further enhanced in step VI, the wash solutions (leach liquors) can be further utilized in the Bayer process.

Our invention also relates to a system for performing the above described process, as illustrated in FIGURE 2.

The new system comprises one or more reactors 7 in which lime is caused to react with the suspensions of residues 9 coming from the digestion of bauxite (step I in FIGURE 1). It comprises thickeners (1, 2, 3,) wherein said residues are washed before they are introduced into a reactor 7. The latter is eventually followed by a caustification tank 8 for treating with $Na_2CO_3$ the residues as they come from the reactor. Succeeding to the caustification tank 8 there are provided one or more thickeners 4 and/or rotary filters 5, 6 for washing out and finally separating the residue. Of course, when the system is operated without a caustification tank, washers should be placed immediately after the reactor 7; in fact, their role is then a double one, since, during the washing an excess of dissolved lime present in the liquor from the reactor, continues to react with the insoluble sodium silico aluminate in solubilizing the $Na_2O$ of the latter.

In thickeners 1, 2 and 3 the residues which enter the system at 9, are washed by first passing into thickener 1 countercurrently to the liquid overflow coming from 2 which is at the same time fed at 10. The leach liquor separated in thickener 1 flows through conduit 11 down to the part of an alumina production plant where it is used, for instance, in the diluting apparatus of the Bayer process.

The slurry thickened in 1, passes through line 12 into thickener 2 into which there flows, on the other hand, by way of line 13, the overflow liquid from the thickener 3. The slurry thickened in 2 is sent through line 14 into thickener 3 which is fed through line 15 with the clarified liquid coming from thickener 4; in the latter device, the slurry is settled which comes from caustification tank 8.

The slurry having been subjected to washing in 1, 2 and 3 passes through line 16 into reactor 7, into which lime is introduced as indicated by arrow 17; filtered liquid coming from the rotative filter 5 also flows by way of line 18a into the reactor 7.

After the treatment with lime is completed, the suspension passes from reactor 7 into the caustification tank 8 into which the necessary sodium carbonate is poured by way of 19. When the caustification is terminated, the suspension passes into thickener 4 where a fraction of the liquid 18 coming from filter 5 through line 18b is added thereto.

The sludge which settles in 4 is removed through line 20; it is diluted with the liquid drawn off via line 21 from filter 6; thus diluted, the sludge passes into the rotative filter 5 through line 22.

The cake 23 formed on filter 5 is diluted with water 24, and the resulting slurry passes by way of line 25 into the rotative filter 6. The exhausted residue leaves the process cycle at 26.

The process according to the invention may be worked in a continuous manner or in batch operations.

The three following non-limitative examples illustrate quantitatively the invention.

*Example I*

A bauxite containing 5.5% $SiO_2$ was treated in the conventional manner by the Bayer process; it left a residue (red mud) having 12.2% $SiO_2$ and 8.6% $Na_2O$ in insoluble form, these contents being calculated on the weight of dry matter contained in the mud. An amount of the residue, corresponding to 250 kg. of dry matter, was subjected to the treatment according to the invention; it was suspended in 1140 liters of weak alkaline solution containing 12.9 g. $Na_2O$ and 1 g. $Al_2O_3$ per liter. Thus, 1250 liters of suspension were obtained, which contained 200 g. of dry matter per liter.

To the suspension there were added 70 kg. of CaO in the form of slaked lime, i.e. about 3.6 moles of CaO per mole of insoluble $Na_2O$. The mixture was stirred during 6 hours at 90° C.

After separating and washing the final residue from the above solubilization step, a solution was obtained which contained 27.9 g./liter of $Na_2O_3$ and 1.5 g./liter of $Al_2O_3$. The treatment led to the solubilization of 17 kg. $Na_2O$, which corresponds to a yield of 79%.

*Example II*

A treatment with lime was carried out exactly in the same conditions as in Example I. However, before separating the final residue from the solution obtained by the stabilization step, 17.5 kg. of sodium carbonate corresponding to 10 kg. $Na_2O$ were added to the suspension. Stirring of the suspension was still continued for 2 hours at 90° C. Thereafter, it was filtered and washed. The resulting filtrate solution contained 34 g./liter of caustic $Na_2O$ and 3 g./liter of carbonated $Na_2O$. The treatment with sodium carbonate resulted in the caustification of 6.6 kg. of $Na_2O$, corresponding to 26.4 kg. $Na_2O$ per ton of the starting residue (red mud).

Consequently, 66% of the introduced $Na_2CO_3$ were caustified. The entire treatment, which envolved the consumption of 70 kg. of lime and 17.5 kg. of soda, resulted in the recovery of caustic value corresponding to 17 kg. of $Na_2O$ from the insoluble silico-aluminate of the residue, and in the transformation of 66% of the used carbonate into a caustic soda solution corresponding to 6.6 kg. $Na_2O$.

*Example III*

300 kg. of residue from the Bayer digestion of a bauxite having 10% combined silica, are treated with 1530 liters of liquor containing per liter 19.8 g. of total $Na_2O$ content and 4 g. of $Al_2O_3$, in which liquor 200 kg. of slaked lime having a CaO content of 70% have been suspended, which lime was previously ground with water so that the average diameter of its particles was comprised between 5 and 10 microns. The proportion of lime thus utilized corresponds to a ratio by weight of $$\frac{CaO}{\text{insoluble } Na_2O} = 3.3$$

The treatment is carried out in an autoclave under stirring at 225° C. during 30 minutes.

The residue is then separated from the liquor. The latter contains.

| | G. per liter |
|---|---|
| $Al_2O_3$ | 5.0 |
| Total $Na_2O$ | 46.4 |
| Caustic $Na_2O$ | 45.4 |

The starting residue contained 14.03% of insoluble $Na_2O$ and 0.27% of soluble $Na_2O$. The solubilization treatment, as in Example I, leads to caustic values corresponding to:

$$(46.4-19.8) \times 1.530 - 0.27 \times 3 = 39.9 \text{ kg. of } Na_2O$$

and the yield of solubilization is:

$$39.9 : (14.03 \times 3) \times 100 = 94.8\%$$

In the following table there are given the analytical compositions of: bauxite, residue (red mud) from Bayer digestion, and final residue from the treatment with lime in aqueous medium according to the process of the invention:

| | Bauxite | Bayer mud | Residue of treatment |
|---|---|---|---|
| Ignition loss | 12.5 | 5.9 | 12.0 |
| $SiO_2$ | 10.0 | 18.8 | 14.0 |
| $TiO_2$ | 2.8 | 5.0 | 3.4 |
| $Fe_2O_3$ | 20.0 | 33.8 | 23.6 |
| $Al_2O_3$ | 54.5 | 21.2 | 14.5 |
| CaO | | 0.6 | 30.8 |
| Insoluble $Na_2O$ | | 14.03 | 0.8 |
| Soluble $Na_2O$ | | 0.27 | |
| Total | 99.8 | 99.6 | 99.1 |

Granulometric composition of the lime utilized in Example III:

| | Percent |
|---|---|
| Grains having in diameter less than 65 microns | 100 |
| Grains having in diameter less than 45 microns | 87.7 |
| Grains having in diameter less than 25 microns | 65.4 |
| Grains having in diameter less than 15 microns | 52.4 |
| Grains having in diameter less than 5 microns | 25.7 |
| Grains having in diameter less than 2.5 microns | 15.6 |

"Average diameter" = 6.1 microns

"(The average diameter D is calculated from the equation $$D = \frac{6}{Sd}$$

wherein S is the specific surface of the grains and $d$ their specific weight)."

*Example IV*

In a system similar to that shown in FIGURE 2 of the drawings, but having no caustification tank 8, red muds were treated, which contained, when dry, 10.1% of $SiO_2$ and 6.8% of $Na_2O$ bound in water-insoluble form.

The muds were dispersed in an aqueous solution containing 12 g. of $Na_2O$ and 2 g. of $Al_2O_3$ per liter, so as to have 160 g. of dry mud in suspension per liter of the solution.

The suspension was treated with slaked lime employed in the ratio of 4 moles of CaO per mole of insoluble $Na_2O$ contained in the suspension. The operation was conducted in a continuous manner; the suspension, homogenized by adequate stirring, was introduced into reactor 7, into which simultaneously a slurry of lime was poured. The liquid mixture thus formed remained within the reactor for 8 hours at 750° C.

From the reactor, the suspension flowed constantly into a thickener which yielded a separated clarified solution having 20.6 g. $Na_2O$ and 0.6 g. $Al_2O_3$ per liter. The thickened residue, withdrawn at the bottom of the thickener, was conveyed to a system for methodically washing it in countercurrent flow with water containing 2 g. of $Na_2O$ and 1 g. of $Al_2O_3$ per liter.

The following table gives the compositions of dry mud (residue) before the treatment at the outlet of the reactor and after washing (final residue):

| | Before treatment, percent | Outlet of the reactor, percent | After washing, percent |
|---|---|---|---|
| Loss of ignition | 6.3 | 13.6 | 11.9 |
| $SiO_2$ | 10.1 | 7.2 | 6.9 |
| $TiO_2$ | 6.0 | 4.4 | 4.4 |
| $Fe_2O_3$ | 48.9 | 35.6 | 36.8 |
| $Al_2O_3$ | 18.1 | 17.5 | 17.3 |
| CaO total | 3.4 | 20.2 | 21.8 |
| $Na_2O$ | 6.8 | 0.96 | 0.52 |
| Ratio $Na_2O/SiO_2$ | 0.67 | 0.133 | 0.075 |

The comparison between the ratio by weight of $$\frac{Na_2O}{SiO_2}$$

in the three above analyses, the $SiO_2$ content being constant, shows the following yields for the $Na_2O$ solubilization: 80.1% at the outlet of the reactor, and 88.8% after washing. Therefore, there is an increase in yield due to the fact that the reaction still proceeds during the course of the washing.

After having been treated by the process of the invention, the red muds, that is the residues of the production of alumina by the Bayer process, contain far less insoluble alkali metal oxide compounds than the ordinary red muds, and have, in fact, less than 2% of insoluble $Na_2O$ (calculated on the content of dry matter). Muds having such low caustic values have never been obtained in the conventional treatment of bauxite. Hence, they constitute a new product. As the process according to the invention allows the content in insoluble $Na_2O$ to be lowered below 1%, the residues (red muds) are much more suitable for their various applications, for instance, in metallurgy, in the preparation of pigments for paints and so on, than the conventional ones.

The process of our invention solves the problem of treating silica-rich bauxites in a particulary practical and economical way. It has the advantage of allowing sodium hydroxide, retained by the residues of bauxite digestion, to be recovered to a very large extent, regardless of the content in silica of the starting material; there is no decrease in the yield of alumina, but, on the contrary, a gain in the recovery of alumina may be achieved. Moreover, the process of the invention provides the recovery of sodium hydroxide liquors which are directly usable in the work cycle of the Bayer process, without previously concentrating them, for instance, in the washing of Bayer residues (red muds).

The residues resulting are easily filtrable, so that rotary filters can be used.

Of not the least importance is the fact that the new process leads to a very significant saving of fuel, because there is involved operation in the aqueous phase exclusively without any intermediate or preliminary calcination.

While the process according to the invention has been described as applied to bauxite, which is the most attractive source of alumina, it is understood that the process may also be applied to other minerals that contain alumina recoverable by means of alkaline reagents, as well as silica.

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

What is claimed is:

1. In a process for treating alumina- and silica-containing minerals such as bauxite and the like by the steps of digesting the aforesaid mineral in an alkaline medium, so as to obtain a sodium aluminate solution and an undissolved residue which contains sodium oxide bound in water-insoluble form to the alumina and silica therein, and separating the solution from the residue, the improvement which consists essentially of:

(1) washing the residue to reduce its sodium aluminate content, (2) suspending said residue in a weakly alkaline aqueous sodium hydroxide solution having a concentration of up to 50 grams $Na_2O$ per liter and a concentration of less than 30 grams of dissolved $Al_2O_3$ per liter, (3) adding lime to the aqueous suspension in a ratio of 2.5–5 mols lime per mol sodium oxide bound in water-insoluble form to the alumina and silica in the residue, thereby solubilizing the sodium oxide bound in water-insoluble form in the residue, without solubilizing substantial amounts of alumina therefrom, (4) separating the resulting aqueous solution containing dissolved sodium oxide from the still undissolved matter.

2. The process of claim 1, further comprising subsequent to step 3, the step of adding to the suspension resulting from step 3 sodium carbonate, so as to causticify at least a portion of said sodium carbonate.

3. The process of claim 1, wherein the mineral is bauxite and the line is added to the aqueous suspension while the latter is at 50°–240° C.

4. A process according to claim 1, wherein said lime is added in amounts of 3.4 to 4 moles per mole of sodium oxide bound in water-insoluble form in the residue.

5. A process according to claim 1, wherein the lime is added to the aqueous suspension while the latter is heated to a temperature between 50° and 100° C. at atmospheric pressure.

6. A process according to claim 1, wherein the lime is added to the aqueous suspension while the latter is heated to a temperature between 100° and 240° C. at a pressure above 1 atmosphere.

7. A process according to claim 1, wherein said lime is introduced into said aqueous suspension in hydrated form in grains having less than 65 microns in diameter.

8. A process according to claim 1, wherein the weakly alkaline solution in which the residue is suspended, contains 5 g. to 20 g. per liter of $Na_2O$ in soluble form.

References Cited in the file of this patent

UNITED STATES PATENTS

| | | |
|---|---|---|
| 1,256,295 | Charlton | Feb. 12, 1918 |
| 1,410,642 | Bassett | Mar. 28, 1922 |
| 1,422,004 | Sherwin | July 4, 1922 |
| 1,514,657 | Cowles | Nov. 11, 1924 |
| 2,375,342 | Brown | May 8, 1945 |
| 2,375,343 | Brown | May 8, 1945 |

FOREIGN PATENTS

| | | |
|---|---|---|
| 13,875 of 1904 | Great Britain | Apr. 20, 1905 |
| 156,547 | Great Britain (printed application) 1922 | |

OTHER REFERENCES

Gould, R, F., in "Industrial and Engineering Chemistry," vol. 37, No. 9, Sept. 1945, pages 796–802.